Sept. 22, 1931.  W. K. BISHOP  1,824,255
SUPPLEMENTAL ENGINE SUPPORT MEANS
Filed June 21, 1929  2 Sheets-Sheet 1
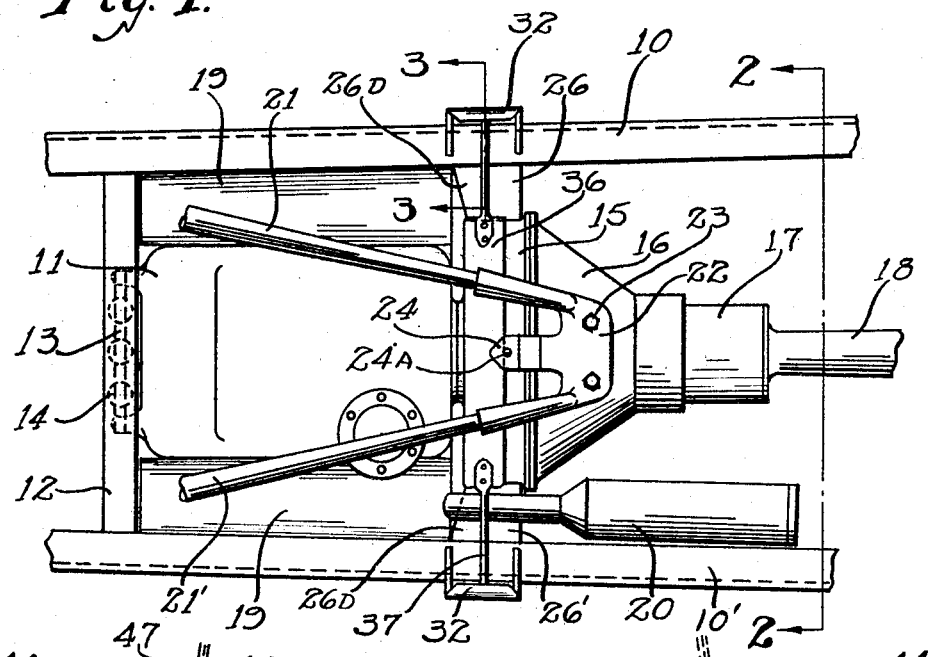
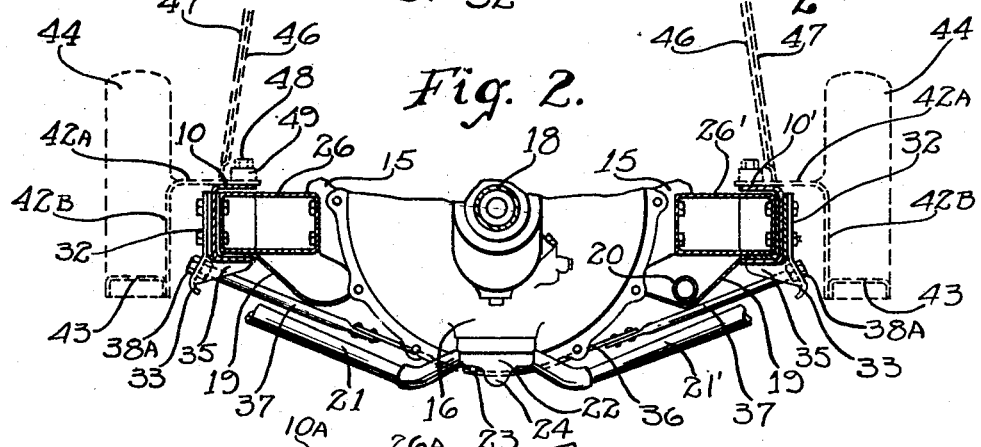
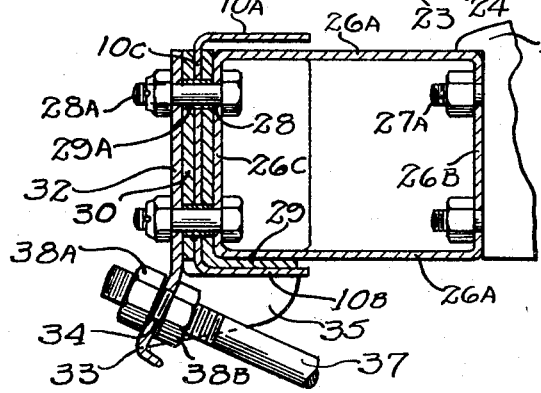
INVENTOR
William K. Bishop.
BY Louis Illmer
HIS ATTORNEY Sept. 22, 1931.  W. K. BISHOP  1,824,255
SUPPLEMENTAL ENGINE SUPPORT MEANS
Filed June 21, 1929   2 Sheets-Sheet 2
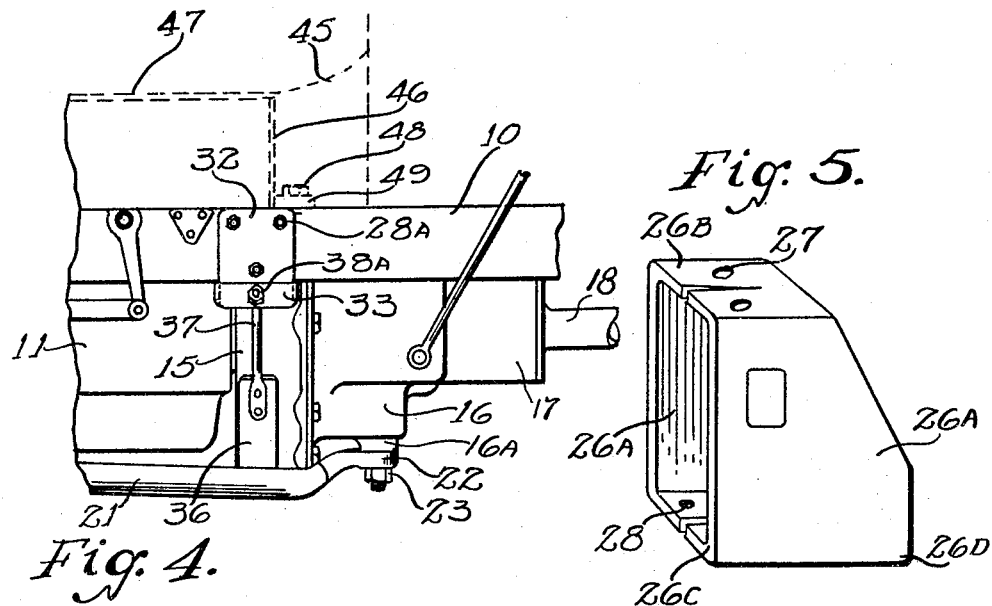
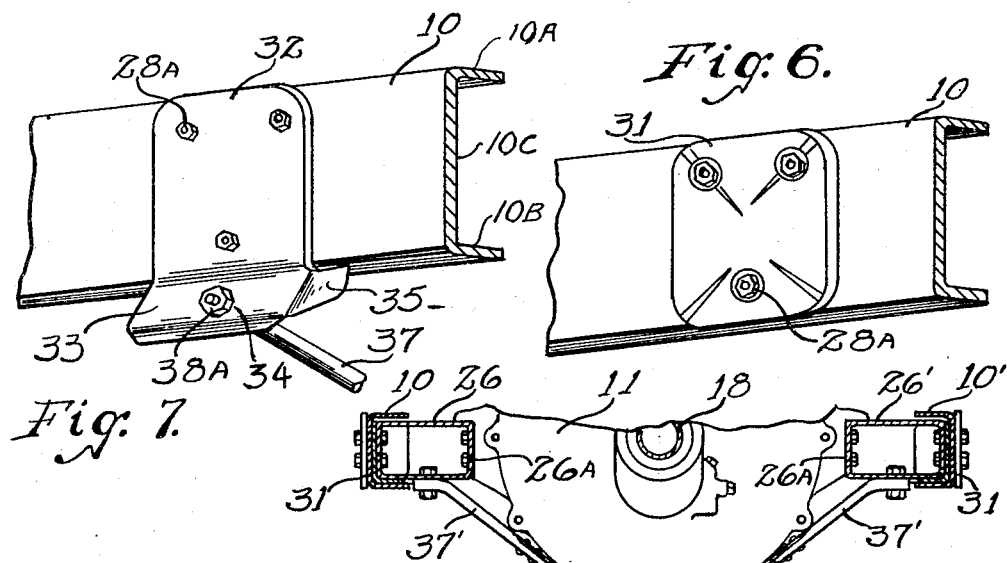
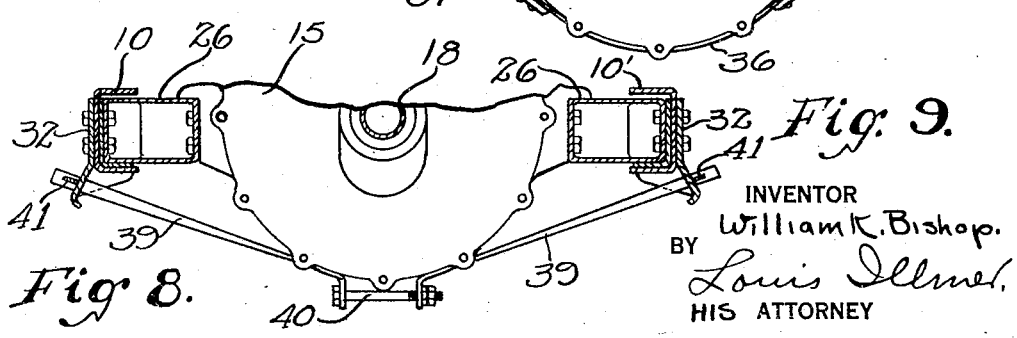
INVENTOR
William K. Bishop.
BY Louis Illmer
HIS ATTORNEY Patented Sept. 22, 1931

1,824,255

UNITED STATES PATENT OFFICE

WILLIAM K. BISHOP, OF BINGHAMTON, NEW YORK, ASSIGNOR TO THE BREWER-TITCHENER CORPORATION, OF CORTLAND, NEW YORK, A CORPORATION OF NEW YORK

SUPPLEMENTAL ENGINE SUPPORT MEANS

Application filed June 21, 1929. Serial No. 372,590.

This invention relates to auxiliary reenforcing means of the suspension type, that is readily attachable to certain existing automobiles or motor trucks; my so-called engine support is adapted to steady the running of reciprocative engine drives as applied to self propelled vehicles, thereby providing for a smoother running of the motor driven parts and correspondingly increasing riding comfort. More particularly, the present improvements are directed to a supplemental bracelike support designed to reach underneath the engine crank-case in a bridging relation to the spaced longitudinal frame members of a motor driven chassis. Transverse tie-means of this kind serve to partially relieve the regular or customary engine support arms of strain and to otherwise abate car vibration; in addition, the engine is more rigidly held in place, especially so in case of inherently weak or fatigued support arm that are inadequate to carry their intended load with entire safety.

Because of the compact assembly practice now prevailing in motor car design, it is no longer practicable to apply thereto such of the conventional engine supports that depend upon hook-like means for securing the suspension terminals over the respective frame beams. In the present instance there have been provided suitable devices for readily attaching support terminals to present-day frame beams without interference, notwithstanding that the respective beam top and side portions may be encasingly concealed behind complementary base guards or have a vehicle body portion extend forwardly over the point of support attachment. As an additional feature, the casing arms have herein been cushioned relative to the sustaining beams and my support device is made to effectively cooperate therewith in order better to absorb road jar.

The object of this invention is to provide for a simple, durable appurtenance of the character indicated and one that may be originally installed as new equipment or can readily be applied to certain existing makes of automobiles or trucks without necessitating any extra drilling of frame parts or similar changes in the prevailing structure thereof. To this end and the accomplishment of other new and useful results, said improvements further consist in novel structural features and also in a compact, symmetrical disposition of my engine support members, all of which will hereinafter be set forth in detail.

Reference is had to the accompanying two sheets of drawings which are illustrative of a specific embodiment of my invention particularly as applied to the model "A" Ford automobile, in which like characters of reference indicate like parts, and in which:

Fig. 1 is a fragmentary bottom view of the aforesaid car model showing its engine crank-case upturned and reenforced by my improved support means of the attachable type.

Fig. 2 represents a transverse elevation as viewed from the rear end section line 2—2 of Fig. 1, while Fig. 3 is an enlarged sectional detail of a frame channel equipt with my attached strap supporting bracket as taken transversely along line 3—3 of Fig. 1.

Fig. 4 shows an elevational side view of Fig. 1 further illustrating certain assembly features of my engine support.

Fig. 5 is a perspective of a typical engine support arm for the aforesaid chassis motor, while Fig. 6 is a conventional cover plate used in association therewith.

Fig. 7 represents in perspective, a combined clamping plate and bracket member adapted to functionally replace said conventional cover plate and arranged to have my engine support strap terminals attached thereto.

Fig. 8 shows a modified style of adjustable strap likewise supported between such complementary frame brackets.

Fig. 9 shows a non-adjustable saddle strap having its ends secured directly to the respective cushioned casing arms rather than through their beam cover plates.

Referring first to Figs. 1 and 2, these are intended to outline certain conventional motor and chassis elements indirectly associated with my devices, said drawings for illustrative purposes being particularly directed to the model "A" Ford automobile chassis which comprises the following parts:

spaced complementary channel bars or rolled metal frame beams 10 and 10' running lengthwise under the body sides, said channels each providing for complementary inturned top and bottom flanges respectively designated as 10A and 10B, and which flanges are interconnected by the vertical web 10C; an engine crank-case housing 11 mounted to bridge said bars; a transverse front beam 12 disposed forward of the engine and serving to pivotally support the front of said housing through a spring mounted cradle-like rocker 13 (shown dotted) that is held in a centrally upright position by means of spaced balancing springs 14, all of which will be understood without detailed disclosure.

Attached rearwardly of the housing 11 is a flywheel housing 15 and in axial alignment therewith, is carried a clutch housing 16 and also a transmission housing 17. For present purposes, all the described underslung motor housings namely 11, 15, 16 or 17, may be considered as equivalent crank casing members. Extending rearward from the last named housing is a conventional propeller shaft 18. A drip pan 19 is attached along each of the crank case sides, and over one such pan, the exhaust pipe 20 is carried rearwardly as indicated. As an additional structural feature, the front axle (not shown) is tied to the bottom of the housing 16 by means of the so-called wish-bone brace comprising a pair of diverging forks or legs 21 and 21', of which the rearward ends are adjoined by a flanged tie member 22 that is usually bolted at 23 to a suitable boss 16A carried by the housing portion 16. Said flange is generally provided with a forwardly projecting lug 24 adapted to overhang the bottommost face of the rounded wheel housing 15 and is removably secured thereto by the cottered fastening 24A. As will be seen from Fig. 2, the respective wish-bone forks in reaching forwardly over the enlarged wheel housing 15, are initially dropped somewhat and kept spaced to freely clear the last named housing and this depending disposition permits of interposing my support strap therebetween.

Referring further to the three point engine mounting herein disclosed, this in addition to the front pivoted rocker 13, comprises a pair of rear engine support arms or extensions 26 and 26' disposed outwardly from the respective sides of the wheel housing 15 in the manner indicated in Figs. 1 and 2. As detailed in Fig. 5, said extended arms are generally stamped up from sheet metal to constitute an open box-like structure having parallel side walls such as 26A, and in operative position, these walls are arranged to lie in a horizontal plane. Said hollow arm structure further provides for complementary end abutments of which the shorter wall 26B is provided with spaced bolt holes such as 27 adapted to be secured to the housing 15 by studs 27A while the opposite longer or web contacting end wall 26C is shown as drilled with three holes such as 28, to correspond with the normal cover bolt layout represented in Fig. 6. As depicted in the plan view Fig. 1, the toe 26D of each arm is faced to extend ahead of the transverse forward end wall of the wheel housing 15.

Referring now to Fig. 3, it will be observed that the outermost arm end 26C is resiliently seated into the channel interior by means of an angle-like cushion or rubber padding 29 that bears against the innermost face of the frame web 10C; said pad is further provided with a plurality of integral bushings 29A respectively adapted to surround the cottered through bolts 28A which are body bound and arranged to prevent abnormal slippage between said plate and its adjacent web face. To complete the cushioned mounting for such engine supporting arms, an additional rubber-like plate 30 is applied to the exterior of the channel web 10C; superimposed thereon is a regular or plain metal cover plate 31 that is exteriorly disposed and clamped in place in the fashion shown in Fig. 6.

The hereinbefore described chassis and engine structure conforms to conventional practice, but such resilient three point engine mounting does not wholly prevent engine vibration or obviate an obnoxious rumble within the body interior. To overcome these and other objections, I have devised a simple expedient that may readily be applied to reenforce and otherwise improve the cited style of engine mounting. As exemplified in Fig. 3, the attaching means for my support band preferably comprises a unitary or combined clamping plate and bracket designated as 32. By merely removing said regular cover plates 31 from their respective channel sides and substituting therefor the corresponding drilled brackets plates 32 as shown in Fig. 7, the respective through bolts 28A may still be made to serve for clamping the interposed resilient pads 29 and 30; it will be obvious that while making the indicated replacements, the concealed bolt heads are readily reached through the open end of the arm box shown in Fig. 5.

My substitute bracket piece 32 is adapted to yieldably cooperate with said rubber bound arm mounting, and to this end it is preferred to shape up a one-piece sheet metal stamping comprising a depending angularly disposed flange-like ear 33 that may be turned outwardly and medially drilled at 34; the flanks of said ear may be inturned to form one or more spaced brace lips 35 of which the uppermost edges are adapted to abuttingly seat against the lower face of a bottom channel flange 10B as shown in Fig. 3. Any cocking moment resulting from a heavy pull exerted in the attached shank 37, is counteracted by said reenforcing lip or lips without unduly springing its overhung bracket flange 33.

The strap-like tie piece extending underneath the engine casing and having its terminals respectively supported by the oppositely disposed brackets 32, may comprise a single narrow metal band or saddle 36; to each end portion thereof, may be riveted or otherwise secured a threaded band shank 37, thus providing for a pair of oppositely disposed and interconnected shanks adapted to be suspended between the frame beams in aligned tandem relation. The free extremities of said oppositely disposed shanks, are respectively intended to be entered through contiguous ear holes 34. As shown in Fig. 1, the saddle 36 is preferably disposed to fit snugly around the lower cylindrical face portion of the wheel housing 15 but it may also be made to similarly embrace other housing portions; if desired, a sheet of cushioning material such as rubber or leather may be interposed therebetween.

In order to find sufficient room for the installation of my spanning support member, its elements are without interference passed through the compactly placed motor parts in the manner indicated in Fig. 2. The saddle band 36 is preferably inserted between the housing 15 and said spaced overhung wishbone forks 21 and 21'. Intermediate its ends, one edge of said band 36 is notched to receive and afford clearance space for the flange lug 24. As is further disclosed in Fig. 1, the respective shanks 37 may herein be placed in substantial axial alignment with the longitudinal center line of the band width; owing to the described forward setting of the arm toes 26D, the shank receiving holes 34 as shown in Fig. 4 are brought into symmetrical relation with respect to the ends of their respective depending flange-like ears 33, thus imparting a neat and trim appearance to my bracket installation.

The outermost nuts 38A carried by the respective shank ends are intended to be drawn up snugly so as to exert a reasonable degree of lifting effort against the bottom of the crank casing which in turn partly relieves the loading of the laterally disposed arms 26 and 26' and also generally reenforces and tightens up the engine mounting. After the support saddle has been properly applied, each of the complementary nuts 38B may be locked in place, whereupon the car is made ready for service. The described saddle strap may be kept sufficiently flexible to afford a limited degree of lateral yield and otherwise provide for cooperative action with respect to the bracket cushioning pads 28 and 29.

The described interposed resilient pad mounting serves to effectively relieve the casing arms of severe shock effects and alleviate the straining thereof in the event intense chassis oscillations should while running over rough roads, set up a corresponding whip in the suspended heavy engine parts. It is pointed out however that my support is likewise applicable to a chassis in which resilient pads are eliminated and the arm abutments 26C are rigidly secured to their respective frame beams.

Instead of the preferred devices previously described, said one-piece band type of support may in like fashion be replaced with a two-part suspension in which the adjacent ends of the modified shank or rod members 39 (see Fig. 8) are respectively turned outwardly and given an eye formation adapted to receive the through adjustable tie-link 40; in such alternative design, the outermost free rod ends may be retained in their respective bracket holes 34 by non-adjustable cotters 41 or the like, while the adjusting means are now placed in the region of the interconnected shank ends.

An aim of the present invention is to find sufficient room together with a simple but effective structural embodiment that is capable of being easily incorporated either as an attachment or as new equipment. In such adaptation, the respective terminals of my engine support means may be expeditiously installed in a workmanship-like manner without requiring any extra machine work or causing disfigurement of the motor car finish to which it has been applied. In addition, the breaking loose of the attached drip pans 19 is prevented in case the chassis is subjected to abnormal distortion because of rough roadway conditions or the like; the augmented motor rigidity further serves to maintain better alignment on part of the driven end of the transmission shaft 18.

Referring to the dotted outline of associated body parts that are shown in Figs. 2 and 4, a cross-sectionally angular base guard is disposed lengthwise of each channel bar and this serves to virtually conceal the respective bars from view. The horizontally inturned plate 42A of said guard is disposed to rest directy upon the frame channel flange 10A while its depending apron portion 42B is directed downwardly in an outwardly spaced relation to one of the beam webs 10C. The lowermost longitudinal apron edge carries the running board 43 of which the forward end may be shaped up to form the wheel fender designated as 44.

The body cowl 45 is provided with a forward transverse edge 46 having a hoop-shaped finishing inset adapted to seat the rear end of the motor hood 47 thereon in the usual manner. In this disclosure, the spaced bottom ends of the cowl edge 46 are superimposed upon the plates 42A and are made to forwardly overlie the top side faces of the respective arm extensions 26 and 26' as indicated by dotted elevational outline in Fig. 4. In addition, the opposite foremost corner portions of the body structure are each bolted at 48 to their respective top beam flanges 10A through the medium of separate cowl lugs 49.

Such lug disposition together with the snugly concealed guard encasement given to the respective frame bars, prevents hooking engine support fastening means of the conventional type over the top of respective beam flanges in the customary fashion. By virtue of my improvements, all interference with the easy installation of such supports has been obviated; as a result, the generally recognized benefits inherent in such supplemental crank casing reenforcement may still be applied to the described later and more compactly designed car model, or the like.

It is further to be understood that the disclosed support appurtenances find application to other than Model A Ford cars and trucks, and that various changes in the details and mode of installation of my devices may be resorted to in likewise carrying out my illustrative embodiment, all without departing from the spirit and scope of my invention heretofore described and more particularly pointed out in the claims.

Claims:

1. A crank-casing provided with lateral arm extensions adapted to span a pair of longitudinally disposed chassis beams as applied to engine driven vehicle purposes, an interposed cushioning medium serving to resiliently mount the respective arm extensions relative to their beams, a clamp plate for each of such beams and which plates are respectively equipt with an apertured ear lug disposed to depend outwardly beyond the bottom region of their respective beams, fastening means extending through each such beam and the adjoining plate thereof and respectively adapted to yieldingly cooperate with said cushioned arm extensions, and supplementary support means adjustably suspended between said apertured ears and beneath the crank-casing to reenforce the cushioned mounting thereof, the terminals of said support means being sustained solely by the respective fastening means.

2. In an attachable means for reenforcing a crank-casing mounted to bridge spaced chassis bars of an engine driven vehicle and which bars are given a cross-sectional channel shape each comprising a vertically disposed web plate provided with an inturned top and a bottom flange, the combination of a supplemental engine support extending beneath said casing and comprising complementary adjustable shank-like members adapted for endwise suspension across said bars, tie means interconnecting the contiguous end portions of said shanks, and bracket plate means secured exteriorly of and solely to the web face of each such bar, said brackets each including depending ear means turned outwardly relative to its contiguous web face with a lip extending inwardly underneath the adjoining bottom flange to brace upwardly thereagainst and which lip reenforced ears respectively serve to uphold a terminal portion of said interconnected shanks.

3. In an attachable means for reenforcing a crank-casing mounted upon an engine driven vehicle chassis provided with spaced bars of channel-like profile having their respective pairs of flanges turned inwardly while each of the casing sides is provided with an arm extension that respectively terminates in an abutment entered between one pair of such flanges into adjacency with the inner channel web face thereof, the combination of a bracket plate means disposed exteriorly of each such web in a substantially registering but opposed cooperative relation to the respective arm abutments and which plates are each provided with depending ear means, fastening means separately uniting said plates through their respective contiguous webs and to the abutments disposed therebehind, supplementary engine support means extending beneath said casing and comprising complementary shank-like members placed in endwise suspension across said bars, the innermost shank end portions being operatively interconnected while the opposite shank terminal portions are respectively attached to and upheld by the aforesaid bracket ears which in turn are wholly sustained through their respective fastening means, and adjusting means interposed contiguous to each such attached terminal portion for adjustably altering the effective length of said suspended shanks.

4. In an attachable means for reenforcing a crank-casing mounted upon an engine driven vehicle chassis provided with spaced bars of channel-like profile having their respective pairs of flanges turned inwardly while each of the casing sides is provided with an arm extension that respectively terminates in an abutment entered between one pair of such flanges into adjacency with the inner channel web face thereof, the combination of bracket plate means disposed exteriorly of each such web in a substantially registering but opposed cooperative relation to the respective arm abutments, resilient pad means interposed between each of the plates and their respective contiguous webs and also interposed between the aforesaid abutments and their respective web faces adjacent thereto to constitute a cushion bound casing mounting, bolt means separately clamping each such pair of companion pads toward their respective webs and further serving to secure in place the respective bracket plates associated therewith, and a supplemental engine support applied to said casing and comprising complementary shank-like members placed in endwise suspension across said bars, the innermost shank end portions being operatively interconnected while the opposite shank terminal portions are respectively attached to and upheld by the aforesaid brackets.

5. In an attachable means for reenforcing a crank-casing mounted to bridge spaced chassis bars of an engine driven vehicle, said casing comprising a flywheel housing and an adjacent rearwardly disposed clutch housing provided with a depending boss, complementary forks of the wish-bone type respectively extending rearwardly in converging relation over said flywheel housing, a tie member carried by said boss and serving to interconnect the rear ends of said forks, said tie member being provided with a forwardly projecting lug adapted to overhang said flywheel housing, a supplemental engine support extending underneath said casing and comprising complementary adjustable shank-like members adapted to be suspended in endwise relation across said bars, notched saddle means interconnecting the inner end portions of said shanks, said saddle being inserted between the aforesaid forks in an embracing relation to the bottom face of the flywheel housing with the saddle notch disposed astride said lug, and bracket means secured to each of said bars, said brackets each serving to uphold a terminal portion of said interconnected shanks.

6. In an attachable vehicle appurtenance for reenforcing an existing crank-casing mounted upon an engine driven chassis provided with spaced bars each including a vertically disposed web member while each of the casing sides is provided with an arm extension that respectively terminates in an abutment adapted to adjoin the innermost face of an adjacent bar web, said bars each being regularly furnished with a detachable cover plate disposed exteriorly of their respectively webs and which plates are cooperatively bolted to their respective arm abutments through the contiguous web thereof, the combination of companion substitute bracket plate means provided with securing means and which plates are respectively adapted to functionally replace the aforesaid cover plates, an ear lug carried by and depending from each such substitute plate and which lugs are respectively turned outwardly beyond the bottommost edge of their adjoining plates, and a supplemental engine support extending beneath said casing and comprising oppositely disposed shank-like means placed in endwise suspension across said bars and of which shanks the innermost end portions are operatively interconnected while the opposite terminals thereof are respectively attached to the ear lugs of said securing means and upheld by said substitute bracket plates.

7. An engine driven vehicle comprising a pair of spaced longitudinal frame beams each having an inturned channel profile, a crank casing equipped with oppositely disposed arms respectively having their free ends entered into the beams adjacent thereto and serving to uphold the casing thereacross, an interposed cushioning medium resiliently mounting each of said entered arms relative to their respective beams, a drip-pan carried by each of said beams and respectively disposed to extend inwardly for attachment to the casing, a forked wish-bone member secured to the casing and the forks of which member extend forwardly in a downwardly spaced relation to said drip-pans, and reenforcing support means including a saddle portion suspended beneath the casing and having the respective support terminals upheld by said beams, said saddle being inserted between the drip-pans and said spaced forks.

In testimony whereof, I have herewith set my hand this 18th day of June, 1929.

WILLIAM K. BISHOP.